(12) United States Patent
Ahuja et al.

(10) Patent No.: US 10,963,914 B2
(45) Date of Patent: Mar. 30, 2021

(54) SYSTEM, METHOD, AND RECORDING MEDIUM FOR ADVERTISEMENT REMARKETING

(71) Applicant: International Business Machines Corporation, Armonk, NY (US)

(72) Inventors: Karan Ahuja, Yorktown Heights, NY (US); Kuntal Dey, New Delhi (IN); Seema Nagar, Bangalore (IN); Roman Vaculin, Bronxville, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 139 days.

(21) Appl. No.: 15/180,260

(22) Filed: Jun. 13, 2016

(65) Prior Publication Data

US 2017/0358002 A1    Dec. 14, 2017

(51) Int. Cl.
*G06Q 30/02* (2012.01)
*G06F 3/01* (2006.01)
*G06F 16/24* (2019.01)
*G06F 16/2457* (2019.01)

(52) U.S. Cl.
CPC ......... *G06Q 30/0256* (2013.01); *G06F 3/013* (2013.01); *G06F 16/24578* (2019.01); *G06Q 30/0267* (2013.01)

(58) Field of Classification Search
USPC .......................... 705/14.41; 700/94; 348/135
See application file for complete search history.

(56) References Cited

U.S. PATENT DOCUMENTS

| | | | |
|---|---|---|---|
| 8,322,856 B2 | 12/2012 | Vertegaal et al. | |
| 8,893,164 B1 | 11/2014 | Teller | |
| 9,606,621 B2* | 3/2017 | Lashina | G06F 3/013 |
| 2006/0256133 A1 | 11/2006 | Rosenberg | |
| 2010/0295774 A1 | 11/2010 | Hennessey | |
| 2012/0300061 A1* | 11/2012 | Osman | G06F 1/3231 348/135 |
| 2013/0054576 A1 | 2/2013 | Karmarkar et al. | |
| 2014/0172140 A1* | 6/2014 | Buck | H04L 67/10 700/94 |

(Continued)

OTHER PUBLICATIONS

U.S. Office Action dated Mar. 19, 2018 in co-pending U.S. Appl. No. 15/180,256.

(Continued)

*Primary Examiner* — Saba Dagnew
(74) *Attorney, Agent, or Firm* — Anthony Curro, Esq.; McGinn IP Law Group, PLLC

(57) ABSTRACT

An advertisement remarketing method, system, and non-transitory computer readable medium, include a gaze tracking circuit configured to track a gaze of a user relative to a plurality of advertisements displayed on content-serving devices to determine a focus level of the user with respect to each of the plurality of advertisements, a list creating circuit configured to create a plurality of ranked lists ranking the focus level of the user for each of the plurality of advertisements, each of the plurality of ranked lists corresponding to a different content-serving device of the content-serving devices, and a remarketing circuit configured to remarket advertisements to the user on a user device based on the plurality of ranked lists.

10 Claims, 6 Drawing Sheets

(56) References Cited

U.S. PATENT DOCUMENTS

| | | | |
|---|---|---|---|
| 2014/0207559 A1* | 7/2014 | McCord | G06Q 30/0242 |
| | | | 705/14.41 |
| 2015/0113454 A1 | 4/2015 | McLaughlin | |
| 2015/0248702 A1 | 9/2015 | Chatterton | |
| 2015/0309566 A1 | 10/2015 | Hampiholi et al. | |
| 2016/0066051 A1 | 3/2016 | Caidar et al. | |
| 2016/0225012 A1* | 8/2016 | Ha | G06Q 30/0242 |

OTHER PUBLICATIONS

U.S. Office Action dated Aug. 8, 2018 in co-pending U.S. Appl. No. 15/180,256.
U.S. Office Action dated Jan. 23, 2019, in co-pending U.S. Appl. No. 15/180,256.
U.S. Office Action dated May 31, 2019, in co-pending U.S. Appl. No. 15/180,265.
U.S. Office Action dated Nov. 29, 2019, in co-pending U.S. Appl. No. 15/180,256.
U.S. Office Action dated Mar. 4, 2020, in co-pending U.S. Appl. No. 15/180,256.
Disclosed Anonymously. (2013). Triggering Tooltip on Touch Based Display Using Eye Tracking. ip.com Prior Art Database Technical Disclosure. IPCOM000229373.
Asier, L. B., Amaia, M. Z. & Begona, G. Z. (2015). Eye/Head Tracking Technology to Improve HCI with iPAD Applications. Sensors, 15(2), 2244-2264.
Disclosed Anonymously. (2011). Method and System for Sharing and Collectively Authoring Video Clips Taken by multiple Handheld Devices. ip.com Prior Art Database Technical Dis closure.

* cited by examiner

ADVERTISEMENT REMARKETING METHOD 200

SYSTEM, METHOD, AND RECORDING MEDIUM FOR ADVERTISEMENT REMARKETING

CROSS REFERENCE TO RELATED APPLICATIONS

The present application is a related Application of co-pending U.S. patent application Ser. No. 15/180,256, each of which is filed on Jun. 13, 2016, the entire contents of which are incorporated herein by reference.

BACKGROUND

The present invention relates generally to an advertisement remarketing system, and more particularly, but not by way of limitation, to an advertisement remarketing system for remarketing advertisements (i.e., products, services etc.) to a user, based upon their interest level as measured from prior viewership, in a cross-device and a cross-channel scenario, in a digital behavior context such as browsing the web and using mobile applications.

Conventionally, advertisements have been generated on a user device (such as a mobile phone or computer) while browsing content based on a user's objects of interest in the videos and images within the browsing session or channel being broadcasted.

Other conventional techniques have considered cross-channel and cross-device remarketing from advertisements previously generated and advertised to the user.

However, there is a technical problem in the conventional techniques in that the conventional techniques do not consider remarketing of advertisements based on a measured level of interest of the user in advertisements in a cross-channel and cross-device manner.

SUMMARY

In view of the technical problem, the inventors have considered a non-abstract improvement to a computer technology via a technical solution to the technical problem in which advertisements can be remarketed in a cross-channel and a cross-device manner based on past users objects of interest such that marketing is more personalized and accurately targets an audience that is most likely to purchase the product.

In an exemplary embodiment, the present invention can provide an advertisement remarketing system, including a gaze tracking circuit configured to track a gaze of a user relative to a plurality of advertisements displayed on content-serving devices to determine a focus level of the user with respect to each of the plurality of advertisements, a list creating circuit configured to create a plurality of ranked lists ranking the focus level of the user for each of the plurality of advertisements, each of the plurality of ranked lists corresponding to a different content-serving device of the content-serving devices, and a remarketing circuit configured to remarket advertisements to the user on a user device based on the plurality of ranked lists.

Further, in another exemplary embodiment, the present invention can provide an advertisement remarketing method, including tracking a gaze of a user relative to a plurality of advertisements displayed on content-serving devices to determine a focus level of the user with respect to each of the plurality of advertisements, creating a plurality of ranked lists ranking the focus level of the user for each of the plurality of advertisements, each of the plurality of ranked lists corresponding to a different content-serving device of the content-serving devices, and remarketing advertisements to the user on a user device based on the plurality of ranked lists.

Even further, in another exemplary embodiment, the present invention can provide a non-transitory computer-readable recording medium recording an advertisement remarketing program, the program causing a computer to perform: tracking a gaze of a user relative to a plurality of advertisements displayed on content-serving devices to determine a focus level of the user with respect to each of the plurality of advertisements, creating a plurality of ranked lists ranking the focus level of the user for each of the plurality of advertisements, each of the plurality of ranked lists corresponding to a different content-serving device of the content-serving devices, and remarketing advertisements to the user on a user device based on the plurality of ranked lists.

There has thus been outlined, rather broadly, an embodiment of the invention in order that the detailed description thereof herein may be better understood, and in order that the present contribution to the art may be better appreciated. There are, of course, additional exemplary embodiments of the invention that will be described below and which will form the subject matter of the claims appended hereto.

It is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

The exemplary aspects of the invention will be better understood from the following detailed description of the exemplary embodiments of the invention with reference to the drawings.

DETAILED DESCRIPTION OF THE EXEMPLARY EMBODIMENTS

Figure 1:
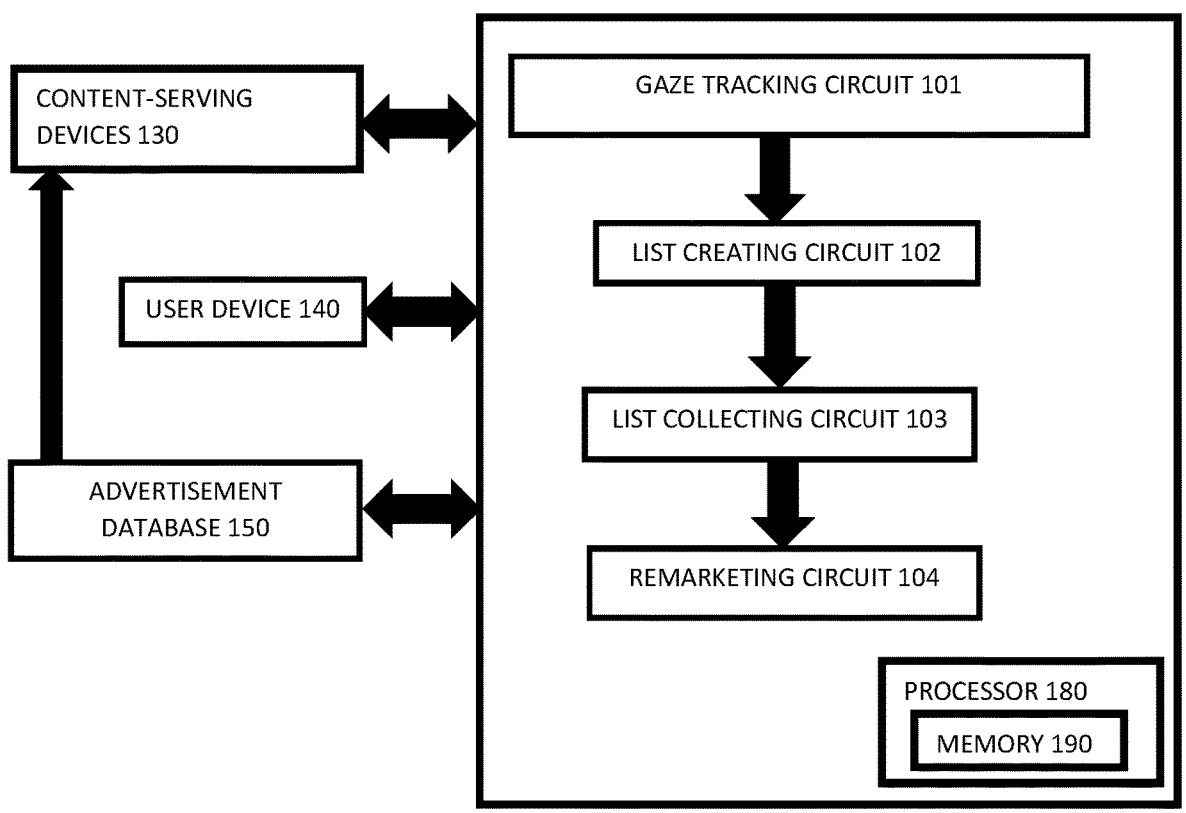
FIG. 1 exemplarily shows a block diagram illustrating a configuration of an advertisement remarketing system 100.

The invention will now be described with reference to FIGS. 1-6, in which like reference numerals refer to like parts throughout. It is emphasized that, according to common practice, the various features of the drawing are not necessarily to scale. On the contrary, the dimensions of the various features can be arbitrarily expanded or reduced for clarity. Exemplary embodiments are provided below for illustration purposes and do not limit the claims.

With reference now to FIG. 1, the advertisement remarketing system 100 includes a gaze tracking circuit 101, a list creating circuit 102, a list collecting circuit 103, and a remarketing circuit 104. The advertisement remarketing system 100 includes a processor 180 and a memory 190, with the memory 190 storing instructions to cause the processor 180 to execute each circuit of advertisement remarketing system 100. The processor and memory may be physical hardware components, or a combination of hardware and software components.

Although the advertisement remarketing system 100 includes various circuits, it should be noted that the advertisement remarketing system can include modules in which the memory 190 stores instructions to cause the processor 180 to execute each module of advertisement remarketing system 100.

Also, each circuit can be a stand-alone device, unit, module, etc. that can be interconnected to cooperatively produce a transformation to a result.

With the use of these various circuits, the advertisement remarketing system 100 may act in a more sophisticated and useful fashion, and in a cognitive manner while giving the impression of mental abilities and processes related to knowledge, attention, memory, judgment and evaluation, reasoning, and advanced computation. That is, a system is said to be "cognitive" if it possesses macro-scale properties—perception, goal-oriented behavior, learning/memory and action—that characterize systems (i.e., humans) that all agree are cognitive.

Cognitive states are defined as functions of measures of a user's total behavior collected over some period of time from at least one personal information collector (e.g., including musculoskeletal gestures, speech gestures, eye movements, internal physiological changes, measured by imaging circuits, microphones, physiological and kinematic sensors in a high dimensional measurement space, etc.) within a lower dimensional feature space. In one exemplary embodiment, certain feature extraction techniques are used for identifying certain cognitive and emotional traits. Specifically, the reduction of a set of behavioral measures over some period of time to a set of feature nodes and vectors, corresponding to the behavioral measures' representations in the lower dimensional feature space, is used to identify the emergence of a certain cognitive state(s) over that period of time. One or more exemplary embodiments use certain feature extraction techniques for identifying certain cognitive states. The relationship of one feature node to other similar nodes through edges in a graph corresponds to the temporal order of transitions from one set of measures and the feature nodes and vectors to another. Some connected subgraphs of the feature nodes are herein also defined as a "cognitive state". The present application also describes the analysis, categorization, and identification of these cognitive states further feature analysis of subgraphs, including dimensionality reduction of the subgraphs, for example graphical analysis, which extracts topological features and categorizes the resultant subgraph and its associated feature nodes and edges within a subgraph feature space.

Figure 4:
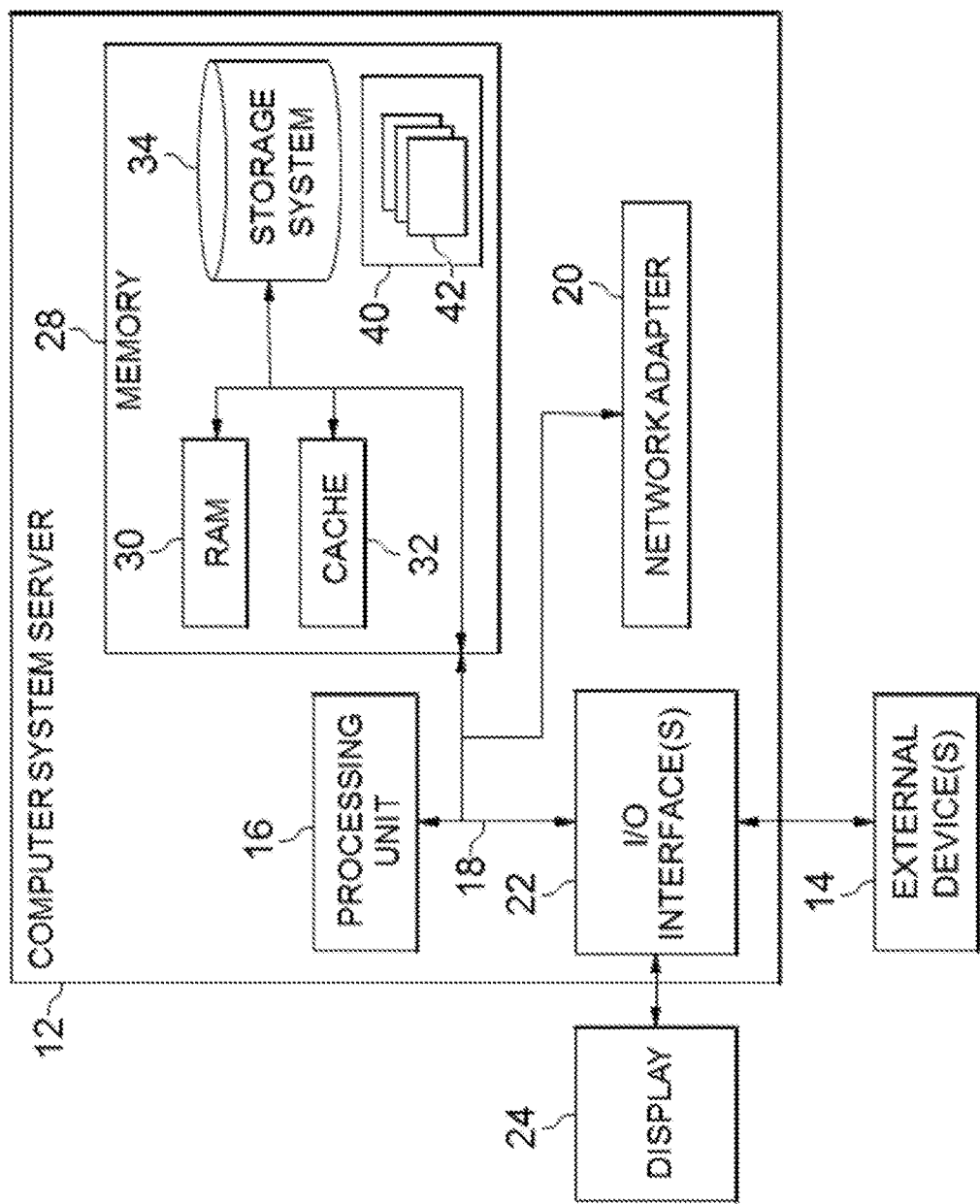
FIG. 4 depicts a cloud computing node 10 according to an exemplary embodiment of the present invention.
Figure 5:
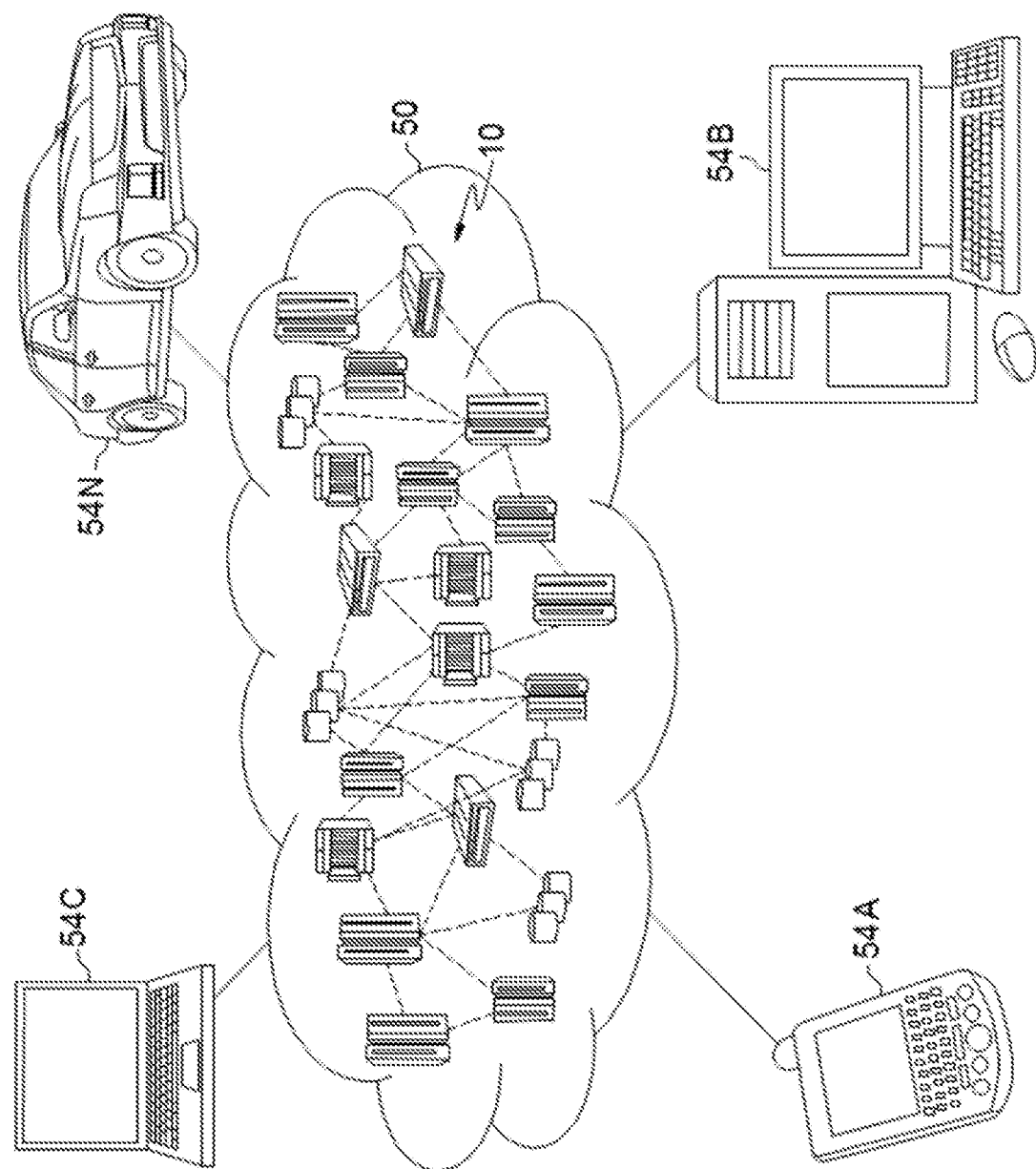
FIG. 5 depicts a cloud computing environment 50 according to another exemplary embodiment of the present invention.
Figure 6:
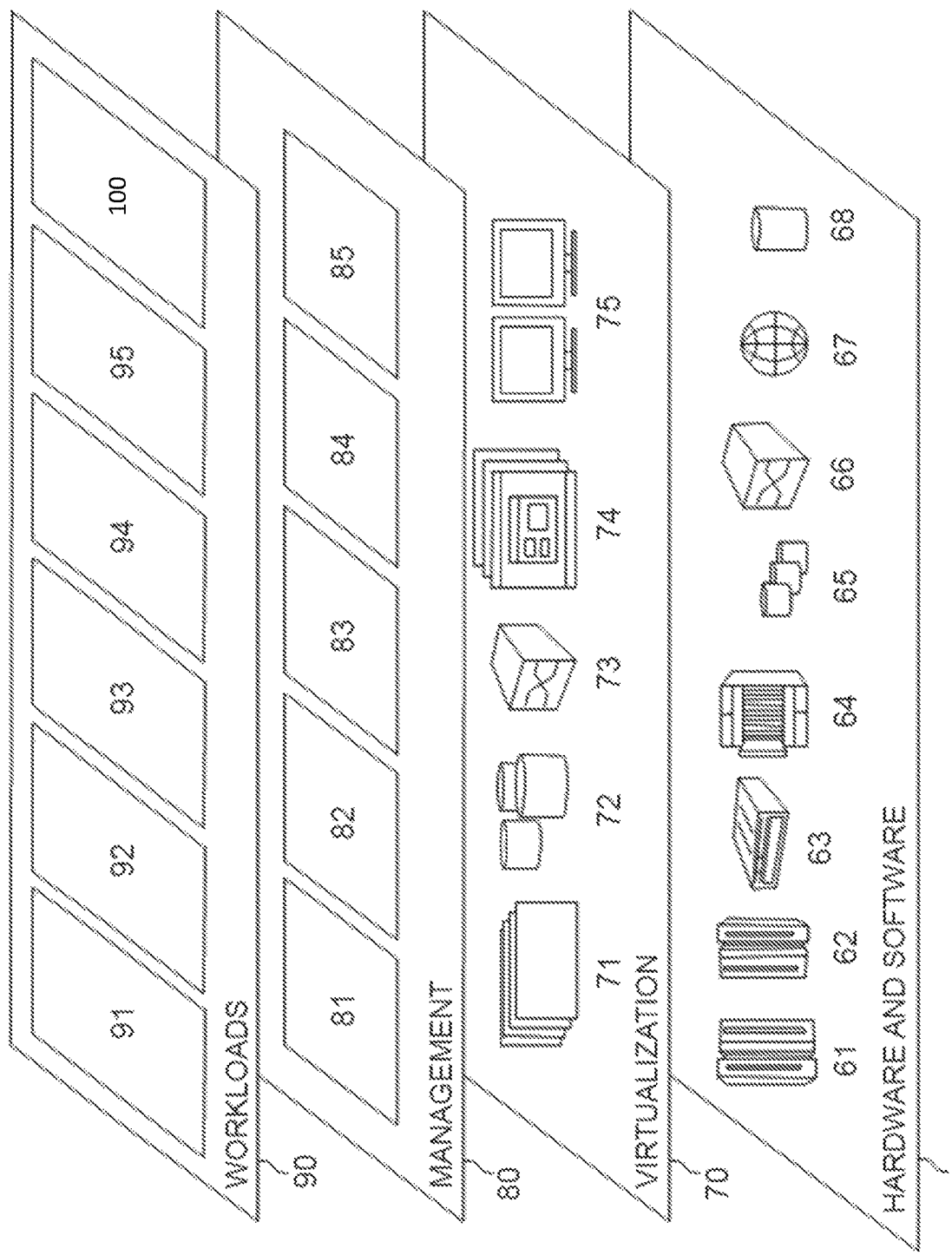
FIG. 6 depicts abstraction model layers according to an exemplary embodiment of the present invention.

Although as shown in FIGS. 4-6 and as described later, the computer system/server 12 is exemplarily shown in cloud computing node 10 as a general-purpose computing circuit which may execute in a layer the advertisement remarketing system 100 (FIG. 6), it is noted that the present invention can be implemented outside of the cloud environment.

Content-serving devices 130 serve advertisement(s) from the advertisement database for a user to view. The content-serving devices 130 can include a television, mobile device, a billboard, a business location, a ticker or banner or any medium(s) that can display an advertisement.

The gaze tracking circuit 101 tracks a gaze of a given user on one or more screen(s) of the content-serving devices 130 where an advertisement is being displayed (for example, as a video being played or one or more images are being shown). The advertisement can be a moving image (video) where objects within the video/image can be identified (using existing video object detection algorithms, object tags, etc.).

The gaze tracking circuit 101 tracks the gaze of the given user in relation to a displayed advertisement by the content-serving devices 130 to determine a focus level (i.e., an attention level) the given user has towards a particular advertisement. The focus level can be determined based on, for example, a total time that the user has spent observing a particular advertisement, a relative time as compared to the time spent viewing all advertisements (i.e., a percentage of the total gazing time), an intensity level of the users gaze as compared to other levels of the user's gaze, etc. Thus, the focus level includes a fixation count, a duration statistic, and other gaze statistics (such as saccades and regressions), etc.

The gaze tracking circuit 101 can utilize existing gaze estimation technology to translate a gaze point to an object, identify the given user, and track the focus points of the user across multiple content-serving devices 130. For example, cameras or sensors set up in a shopping mall can track user's eye focus at advertisements or a computer camera (i.e., "web cam") can monitor a user's eyes as they are watching a movie or browsing the internet.

Based on the tracked gaze of the users and the calculated focus levels, the list creating circuit 102 creates a ranked list of the advertisements corresponding to the focus levels for advertisements displayed by each of the content-serving devices 130.

That is, in an intra-device or intra-channel scenario (i.e., across each of the content-serving devices 130), the list creating circuit 102 creates a list(s) of objects (i.e., advertisements) that the given user has gazed and fixated on based on the focus levels (i.e., based on a fixation count, a duration statistic, and other gaze statistics (such as saccades and regressions)) for each of the objects for each of the content-serving devices 130.

It is noted that "objects" generally refers to advertisements but can include images or videos that are not technically an advertisement but a product itself. For example, if the given user is watching a movie and a person in the movie is wearing a particular style of a dress, even though the object focused on by the user is not an "advertisement" in the traditional sense, the object (i.e., the dress) can be categorized as a brand and included in the list.

Preferably, the list created by the list creating circuit 102 is stored in a ranked order of the advertisements having a highest focus level (i.e., longest time gazed upon) to advertisements with a lowest focus level (i.e., least time gazed upon). Therefore, the list includes the most likely advertisements that the given user may wish to have remarketed to the given user.

The list collecting circuit 103 collects (i.e., aggregates) all of the lists of objects for each of the content-serving devices 130 and creates a combined list of objects. The combined list of objects is aggregately ranked across all of the content-serving devices 130 such that the given users focus levels on all advertisements, regardless of the advertisement display medium(s) (i.e., the content-serving devices 130), is ranked on the single list.

In other words, in an intra-device or intra-channel scenario (i.e., across each of the content-serving devices 130), the list collecting circuit 103 collects each of the list(s) of objects from other content-serving devices 130 (i.e., home TVs, TVs in public places that are equipped with existing identity-recognition modules, laptops, digital image galleries displayed on electronic devices such as tablets and computers, etc.), over multiple channels, such as Blue tooth, Near Field Communication (NFC), the Internet Protocol (IP) network, etc., and prepare a combined list of objects based on the user's focus level. The combined list of objects is preferably ranked based on the user focus levels.

The remarketing circuit 104 receives the list of objects from the list creating circuit 102 or the combined list of objects from the list collecting circuit 103 and remarkets the types of advertisements from the advertisement database 150 to the given user based on the list of objects when the user uses a medium capable of displaying advertisements (i.e., viewing a web page via the user device 140).

In other words, at a later time when the user is viewing content that includes advertisements on a device, the remarketing circuit 104 remarkets the advertisements (objects) that the gaze tracking circuit 101 detected a focus level for the user on. Thus, the user is remarketed advertisements that the user has already shown interest in thereby more effectively advertising to a given user based on their past focus level in advertisements.

That is, the remarketing circuit 104 uses the list(s) of objects including the objects or advertisements of interest and gaze statistics, when the user is browsing, for the purpose of being served with remarketed advertisements that satisfy the user's objects of interest. Thus, a previous advertisement that the user has shown interest in as detected by the user's focus level via the gaze tracking circuit 101 is remarketed (i.e., re-distributed) to the user when the user views content that includes advertisements at a following time (such as on a user device 140).

Thus, the advertisement remarketing system 100 enables a remarketing of advertisements at a present time when using a device based on prior expressed interest of a user when viewing advertisements on a plurality of devices that display advertisements (i.e., in an inter-device and inter-channel scenario).

Further, it is noted that the system may in time "learn" what a user's preferences and likes (and dislikes) may be and as such may provide related advertisements to the user on previous gaze tracking sessions.

Figure 2:
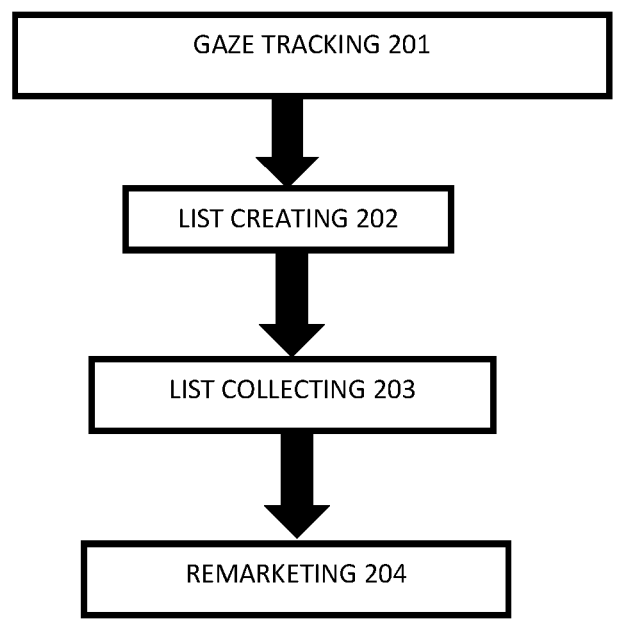
FIG. 2 exemplarily shows a high level flow chart for an advertisement remarketing method 200.

FIG. 2 shows a high level flow chart for a method 200 of advertisement remarketing.

Step 201 tracks a gaze of a given user on one or more screen(s) of the content-serving devices 130 where an advertisement is being display (for example, as a video being played or one or more images are being shown) to determine a focus level of the user with respect to the advertisements.

Based on the tracked gaze of the users and the calculated focus levels of Step 201, Step 202 creates a ranked list of the advertisements corresponding to the focus levels for advertisements displayed by each of the content-serving devices 130.

Step 203 collects (i.e., aggregates) all of the lists of objects for each of the content-serving devices 130 created by Step 202 and creates a combined list of objects. The combined list of objects is aggregately ranked across all of the content-serving devices 130 such that the given users focus levels on all advertisements, regardless of the advertisement display medium(s) (i.e., the content-serving devices 130), is ranked on the single list.

Step 204 receives the list of objects from Step 202 or Step 203 and remarkets the types of advertisements from the advertisement database 150 to the given user based on the list of objects when the user uses a medium capable of displaying advertisements (i.e., viewing a web page via the user device 140).

Figure 3:
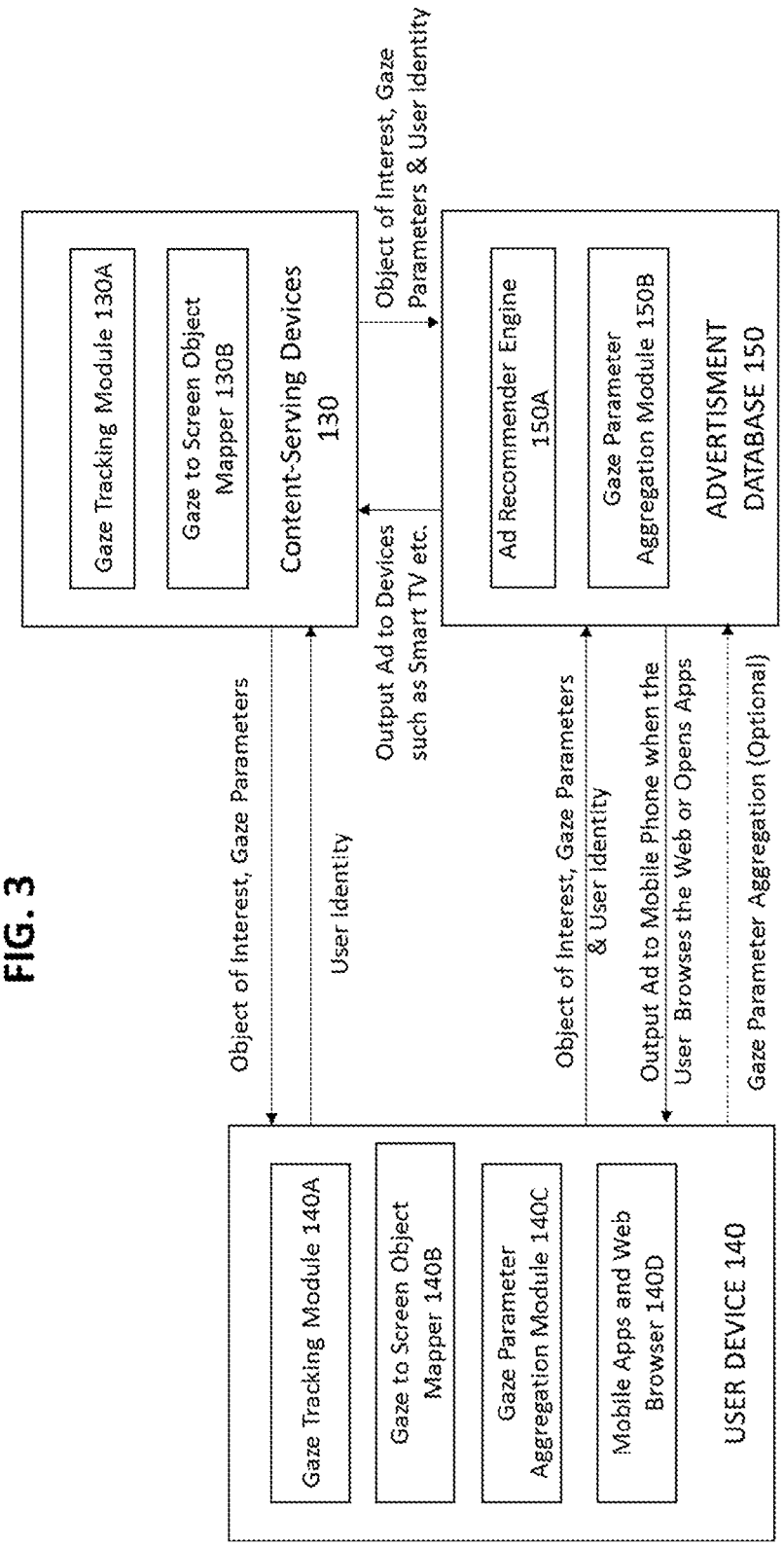
FIG. 3 exemplarily shows an exemplary remarketing of advertisements between a user device 140, content-serving devices 130, and an advertisement database 150 as facilitated by the advertisement remarketing system 100.

FIG. 3 shows an exemplary embodiment of the system 100 facilitating remarketing of advertisements via the content-services devices 130, a user device 140, and an advertisement database 150.

The first and second content-serving devices 130 receive advertisements from the advertisement database 150 (e.g., via the ad recommender engine 150A).

For example, a user can be in a store, restaurant, etc. (e.g., a first content-serving device 130) in which the gaze tracking module 130B (e.g., a gaze tracking circuit 101) tracks the users gaze and maps the gaze (130B) to a first advertisement on a wall of the store for ten seconds and a second advertisement on the wall of the store for one second. Further, the user can be watching a movie on a TV (e.g., a second content-serving device 130) and the gaze tracking module 130B (e.g., a gaze tracking circuit 101) tracks the users gaze and maps the gaze (130B) to a third object that the main actor is using, wearing, etc. for thirty seconds and a fourth object for eight seconds. Similarly, the user device 140 can track the gaze of the user on a device owned by the user via the gaze tracking module 140A and map the gaze to the object (140B).

The focus level for each of the advertisements that the user gazed at is received by the user device 140 or the advertisement database 150 in which the list creating circuit 102 (e.g., the gaze parameter aggregation module 140C or the gaze parameter aggregation module 150B) creates the list of objects for each of the first content-serving device 130 and the second content-serving device 130 according to the focus level.

For example, the list creating circuit 102 creates a first list for the first content-serving device 130 in which the first advertisement is ranked ahead of the second advertisement and a second list for the second content-serving device 130 in which the third advertisement is ranked ahead of the fourth advertisement.

The list collecting circuit 103 (e.g., the gaze parameter aggregation module 140C or the gaze parameter aggregation module 150B) collects each of the lists created by the list creating circuit 102 and aggregates the lists to a combined list. The combined list would be, in order of the focus level, the third object, the first object, the fourth object, and the second object. That is, the collecting circuit 103 aggregates the list in order of the focus level (i.e., in this case the time gazed at the object). While aggregation may be based preferably on focus level, other criteria also (or alternatively) could be used based on the designer's needs and requirements.

When the user uses the user device 140 at a later time, the remarketing circuit 104 (e.g., the mobile apps and web browser 140D) receives remarketed advertisements from the advertisement database 150 according to the combined list and the remarketing circuit 104 populates the advertisements slots of the content being viewed by the user with the remarketed advertisements that the user has previously shown interest in. Preferably, the remarketing circuit 104 remarkets the advertisements in order of the combined list.

Exemplary Hardware Aspects, Using a Cloud Computing Environment

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client circuits through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 4, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop circuits, multiprocessor systems, microprocessor-based systems, set top boxes, programmable consumer electronics, network PCs, minicomputer systems, mainframe computer systems, and distributed cloud computing environments that include any of the above systems or circuits, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing circuits that are linked through a communications network. In a distributed cloud computing environment, program modules may be located in both local and remote computer system storage media including memory storage circuits.

As shown in FIG. 4, computer system/server 12 in cloud computing node 10 is shown in the form of a general-purpose computing circuit. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external circuits 14 such as a keyboard, a pointing circuit, a display 24, etc.; one or more circuits that enable a user to interact with computer system/server 12; and/or any circuits (e.g., network card, modem, etc.) that enable computer system/server 12 to communicate with one or more other computing circuits. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, circuit drivers, redundant processing units, external disk drive arrays, RAID systems, tape drives, and data archival storage systems, etc.

Referring now to FIG. 5, illustrative cloud computing environment 50 is depicted. As shown, cloud computing environment 50 comprises one or more cloud computing nodes 10 with which local computing circuits used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing circuit. It is understood that the types of computing circuits 54A-N shown in FIG. 8 are intended to be illustrative only and that computing nodes 10 and cloud computing environment 50 can communicate with any type of computerized circuit over any type of network and/or network addressable connection (e.g., using a web browser).

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage circuits 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, more particularly relative to the present invention, the advertisement remarketing system 100 described herein.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. An advertisement remarketing system for remarketing advertisements in a digital behavior context based upon an interest as measured from prior viewership, comprising:
    a processor; and
    a memory, the memory storing instructions to cause the processor to execute:
        a gaze tracking circuit configured to track a gaze of a user relative to a plurality of advertisements displayed on different types of content-serving devices both owned by the user and owned by a third party by combining an intra-device gaze of a gaze history of saccades and regressions by the user relative to the user owned device and the gaze of the viewer relative to the third party device together to determine a focus level of the user with respect to each of the plurality of advertisements;
        a list creating circuit configured to create a plurality of ranked lists ranking the focus level of the user for each of the plurality of advertisements, each of the plurality of ranked lists corresponding to a different content-serving device of the content-serving devices, the plurality of ranked listed being stored in a database; and
        a remarketing circuit configured to output and remarket advertisements, to the user a second time that were previously advertised to the user in one of a cross-device and a cross-channel scenario on a user device based on the plurality of ranked lists,
    wherein, at the second time when the user is viewing content that includes advertisements on the user device, the remarketing circuit remarkets the advertisements that the gaze tracking circuit detected the focus level for the user on such that the user is remarketed advertisements that the user has already shown interest in thereby advertising to the user at the second time based on a past focus level in the advertisements,
    wherein the focus level is based on an amount of time that the user has gazed at an advertisement relative to a total amount of time that the gaze tracking circuit has tracked the gaze of the user,
    wherein each of the ranked lists is ranked in order of a highest focus level for an advertisement with respect to the content-serving device that displayed the advertisements of the ranked list,
    wherein a highest ranked advertisement on a ranked list of the plurality of ranked lists corresponds to an advertisement that has a highest focus level,
    wherein the remarketing circuit remarkets the advertisements at a top of the plurality of ranked lists to thereby provide the user with a previously viewed advertisement having a highly ranked focus level on the user device when the user views a medium including advertisement slots, and
    wherein the database is updated with a result of the remarketing circuit.

2. The system of claim 1, further comprising a list collecting circuit configured to collect and combine all of the plurality of ranked lists into a combined ranked list.

3. The system of claim 2, wherein the combined ranked list ranks all of the advertisements that the user has gazed at across all of the content-serving devices in order of the focus level for each of the advertisements.

4. The system of claim 2, wherein the list collecting circuit collects all of the plurality of ranked lists via a plurality of communication channels, the communication channels including any one of:
    Bluetooth;
    Near Field Communication (NFC); and
    an Internet Protocol (IP) network.

5. The system of claim 1, further comprising a list collecting circuit configured to combine into a combined ranked list the plurality of ranked lists of advertisements aggregately ranked across all of the content-serving devices such that the focus level of the user for the advertisements is included in the combined ranked list.

6. The system of claim 1, further comprising a list collecting circuit configured to combine into a combined ranked list the plurality of ranked lists of advertisements aggregately ranked across all of the content-serving devices such that the focus level of the user for the advertisements, regardless of the content-serving device that displayed the advertisements, is included in the combined ranked list.

7. The system of claim 1, wherein the content-serving devices include a medium that displays an advertisement.

8. An advertisement remarketing method for remarketing advertisements in a digital behavior context based upon an interest as measured from prior viewership, comprising:
    tracking a gaze of a user relative to a plurality of advertisements displayed on different types of content-serving devices both owned by the user and owned by a third party by combining an intra-device gaze of a gaze history of saccades and regressions by the user relative to the user owned device and the gaze of the viewer relative to the third party device together to determine a focus level of the user with respect to each of the plurality of advertisements;
    creating a plurality of ranked lists ranking the focus level of the user for each of the plurality of advertisements, each of the plurality of ranked lists corresponding to a different content-serving device of the content-serving devices, the plurality of ranked listed being stored in a database; and
    outputting and remarketing advertisements to the user a second time that were previously advertised to the user in one of a cross-device and a cross-channel scenario on a user device based on the plurality of ranked lists, wherein, at the second time when the user is viewing content that includes advertisements on the user device, the remarketing remarkets the advertisements that the gaze tracking detected the focus level for the user on such that the user is remarketed advertisements that the user has already shown interest in thereby advertising to the user at the second time based on a past focus level in the advertisements, wherein the focus level is based on an amount of time that the user has gazed at an advertisement relative to a total amount of time that the tracking has tracked the gaze of the user, wherein each of the ranked lists is ranked in order of a highest focus level for an advertisement with respect to the content-serving device that displayed the advertisements of the ranked list, wherein a highest ranked advertisement on a ranked list of the plurality of ranked lists corresponds to an advertisement that has a highest focus level, wherein the remarketing remarkets the advertisements at a top of the plurality of ranked lists to thereby provide the user with a previously viewed advertisement having a highly ranked focus level on the user device when the user views a medium including advertisement slots, and wherein the database is updated with a result of the remarketing.

9. The method of claim 8, further comprising collecting and combining all of the plurality of ranked lists into a combined ranked list.

10. A non-transitory computer-readable recording medium recording an advertisement remarketing program for remarketing advertisements in a digital behavior context based upon an interest as measured from prior viewership, the program causing a computer to perform:

tracking a gaze of a user relative to a plurality of advertisements displayed on different types of content-serving devices both owned by the user and owned by a third party by combining an intra-device gaze of a gaze history of saccades and regressions by the user relative to the user owned device and the gaze of the viewer relative to the third party device together to determine a focus level of the user with respect to each of the plurality of advertisements;

creating a plurality of ranked lists ranking the focus level of the user for each of the plurality of advertisements, each of the plurality of ranked lists corresponding to a different content-serving device of the content-serving devices, the plurality of ranked listed being stored in a database; and outputting and remarketing advertisements to the user a second time that were previously advertised to the user in one of a cross-device and a cross-channel scenario on a user device based on the plurality of ranked lists, wherein, at the second time when the user is viewing content that includes advertisements on the user device, the remarketing remarkets the advertisements that the gaze tracking detected the focus level for the user on such that the user is remarketed advertisements that the user has already shown interest in thereby advertising to the user at the second time based on a past focus level in the advertisements, wherein the focus level is based on an amount of time that the user has gazed at an advertisement relative to a total amount of time that the tracking has tracked the gaze of the user, wherein each of the ranked lists is ranked in order of a highest focus level for an advertisement with respect to the content-serving device that displayed the advertisements of the ranked list, wherein a highest ranked advertisement on a ranked list of the plurality of ranked lists corresponds to an advertisement that has a highest focus level, wherein the remarketing remarkets the advertisements at a top of the plurality of ranked lists to thereby provide the user with a previously viewed advertisement having a highly ranked focus level on the user device when the user views a medium including advertisement slots, and wherein the database is updated with a result of the remarketing.

* * * * *